UNITED STATES PATENT OFFICE.

WILSON U. JURY, OF SHAMOKIN, PENNSYLVANIA.

COMPOSITIONS OF MATTER FOR BUILDING AND STRUCTURAL PURPOSES.

1,279,119.   Specification of Letters Patent.   Patented Sept. 17, 1918.

No Drawing.   Application filed June 10, 1918.   Serial No. 239,233.

*To all whom it may concern:*

Be it known that I, WILSON U. JURY, a citizen of the United States, residing in Shamokin, in the county of Northumberland and State of Pennsylvania, have invented certain new and useful Improvements in Compositions of Matter for Building and Structural Purposes, of which the following is a specification.

The object of this invention is to provide a new composition of matter to be used for all building and structural purposes, but which is especially useful in the construction of dye house and other floors, vats, pits, acid tubs, pools, boats and reinforced concrete structures.

The composition consists of Portland cement, crushed sand from stoker fed boiler ashes obtained from anthracite coal, hydrated lime and liquid soap.

The Portland cement is of the usual kind and ordinary hydrated lime may be employed. Preferably olive oil soap is used mixed with water. The sand is produced by crushing and screening stoker fed boiler ashes or clinker from anthracite coal.

The coal is burned at a temperature sufficient to consume all heat units. All dust is delivered to the dust chamber of the furnace so that nothing but the hard clinker or ash drops from the grate. All loam and vegetable matter is removed. In preparing the sand the crushed ash or clinker is passed through screens to obtain three grades, viz, fine sand, medium fine sand and tailings, which vary in sizes from a pea to a chestnut size, these tailings being used in place of stone when making concrete. The ingredients are mixed and thoroughly incorporated with sufficient water to form a pudding like mass, in which condition the mixture is ready to be poured into forms or molds. For some purposes the mixture consists of Portland cement, crushed sand of the kind before specified, tailings obtained by the crushing and screening process, hydrated lime and liquid soap, but if the mixture is spread on a surface the tailings from the crushed clinker are omitted. The ingredients are preferably combined in the following proportions:

One part Portland cement.
Two parts sand produced by crushing and screening stoker fed boiler ashes or clinkers obtained from anthracite coal.
Three parts tailings from the same crushing.
One-tenth of one part hydrated lime.
Sufficient soap and water to produce a pudding-like mass.

The quantity of water mixed with the soap depends somewhat on the condition of the other ingredients whether they are wet or dry. Ordinarily the liquid soap is produced by mixing one part olive oil soap with four parts of water.

As before stated when the mixture is used as a top coat to spread on a surface the tailings are omitted, otherwise the mixture is the same. Experience has demonstrated that sand produced from stoker fed boiler ashes or clinker and prepared in the manner before stated is very serviceable for the purposes described.

I claim as my invention:

1. A composition for building and structural purposes, comprising Portland cement, hydrated lime, soap, and sand obtained from the ashes or clinker of anthracite coal in substantially the proportions specified.

2. A composition of matter for structural and building purposes, consisting of Portland cement, hydrated lime, liquid soap, sand obtained from the ashes or clinker of anthracite coal, and tailings obtained from said ashes or clinker in substantially the proportions specified.

In testimony whereof, I have hereunto subscribed my name.

WILSON U. JURY.

Copies of this patent may be obtained for five cents each, by addressing the "Commissioner of Patents, Washington, D. C."